United States Patent Office 3,268,806
Patented August 23, 1966

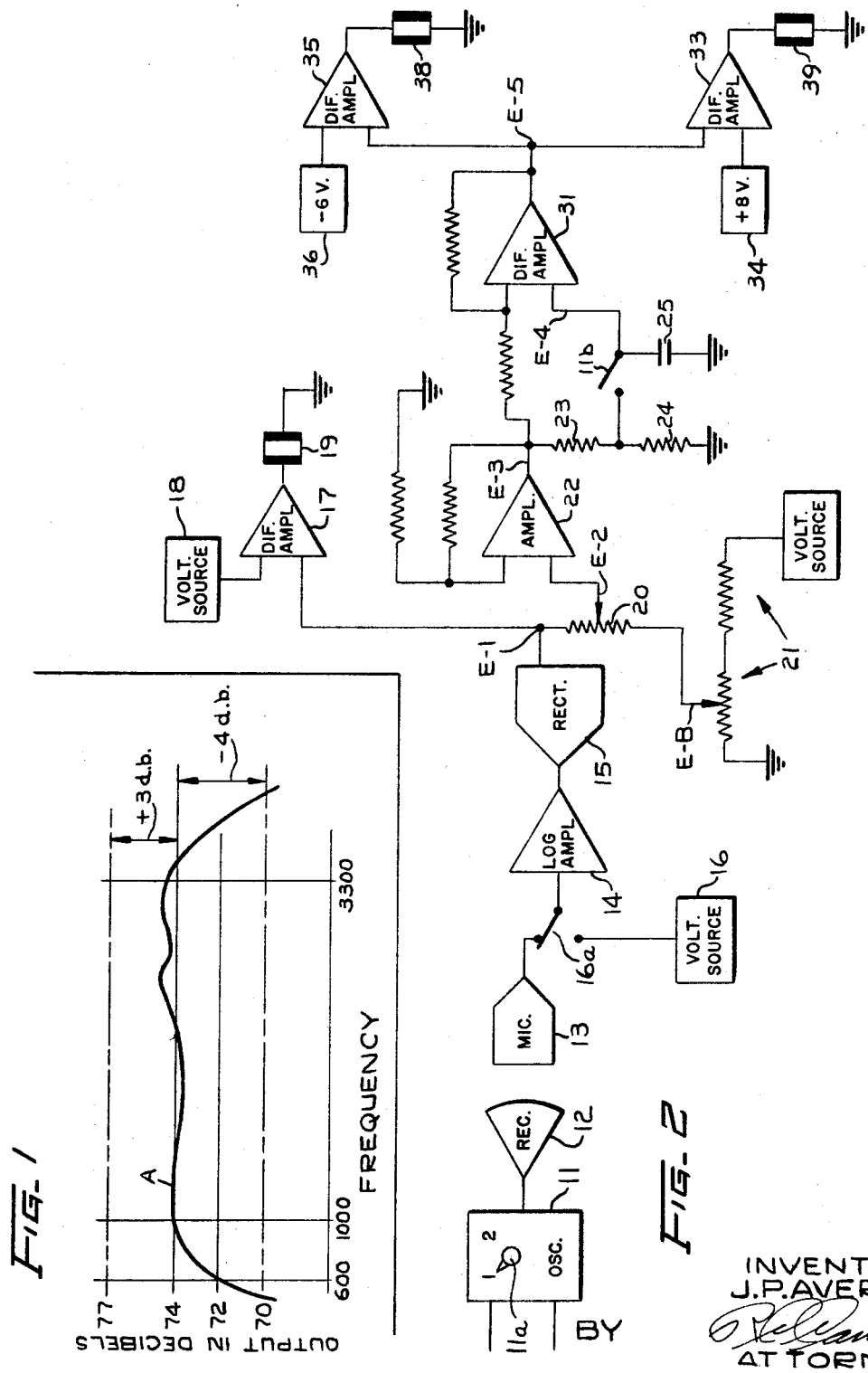

3,268,806
APPARATUS FOR TESTING THE FREQUENCY RESPONSE OF A DEVICE BOTH AT A SPECIFIED FREQUENCY AND AT DIFFERENT FREQUENCIES WITHIN A PREDETERMINED RANGE AND CORRELATING THE RESPONSES
John P. Avery, Indianapolis, Ind., assignor to Western Electric Company, Incorporated, New York, N.Y., a corporation of New York
Filed Nov. 19, 1963, Ser. No. 324,694
7 Claims. (Cl. 324—57)

This invention relates to testing apparatus, and more particularly to apparatus for testing the value of signals produced by a device under varying conditions, relative to the value of a signal produced by the device under reference conditions. It is an object of the invention to provide improved apparatus of such character.

In the testing of the frequency response of various forms of translating devices such as amplifiers, speakers, and microphones, it is frequently desired that the response at one specified frequency fall within certain limits, or meet some minimum specification, and that the response of the same device over a range of frequencies fall within certain limits relative to and correlated with the response of the device at the one specified frequency.

A further object of the invention is to provide improved testing apparatus for indicating whether the response of a device under varying conditions deviates by more than a prescribed amount from the response of the device under reference conditions.

It is another object of the invention to provide improved testing apparatus which measures the response of a device under reference conditions and under varying conditions, compares the response of the device under varying conditions to the response of the device under reference conditions, and indicates whether the response under varying conditions falls outside of limits determined by the response under reference conditions.

In accordance with one embodiment of the invention a signal which is a function of the response of a device under test is compared to a reference signal, and a differential signal is produced which is indicative of the variation of the first signal with respect to the reference signal. An impression of the value of the differential signal is stored during a time that the device is operating under reference conditions. Subsequently, when the device is operating under varying conditions, the differential signal is compared to the stored signal, and a second differential signal is produced which is indicative of the deviation of the first differential signal relative to the stored signal. Preferably, the second differential signal is compared to a reference signal whose magnitude equals the maximum permissible deviation or error, such that an automatic indication can be obtained when the second differential signal exceeds the specified maximum deviation or error.

This invention, together with further objects and advantages thereof, will best be understood by reference to the following description taken in connection with the accompanying drawings, in which:

FIG. 1 is a graph indicating the frequency response of a telephone receiver, and variable limits within which the frequency response should fall; and FIG. 2 is a block diagram of apparatus illustrating one embodiment of the invention.

The apparatus shown in FIG. 2 is particularly adapted to the testing of the frequency response of telephone receivers. The telephone receivers in question are required to meet certain specifications illustrated diagrammatically in FIG. 1. In that figure the vertical coordinate represents the output of a receiver in decibels. The horizontal coordinate is the frequency of the signal applied to the receiver.

One specification requires that the output of the receiver at 1000 cycles be at least 72 db. The curve identified by the letter A in FIG. 1 represents the response of a typical receiver. It will be noted that the output of the receiver whose characteristic line is illustrated, is 74 db at 1000 cycles. Accordingly, the receiver in question is acceptable regarding this first specification.

It is further specified that over the entire range from 600 cycles to 3300 cycles the responses fall between maximum and minimum limits whose values are not absolute but are relative to the response of the particular receiver at 1000 cycles. More particularly, the maximum is specified as 3 db greater than the response of the receiver at 1000 cycles and the minimum is specified as 4 db less than the response of the particular receiver at 1000 cycles. In FIG. 1 the maximum limit of 77 db and the minimum limit of 70 db are shown in phantom lines, these being the maximum and minimum limits for that particular receiver whose response at 1000 cycles is 74 db. It will be noted that the response curve shown in FIG. 1 falls within these maximum and minimum limits and is, therefore, acceptable.

The apparatus shown in FIG. 2 includes an oscillator 11 which may be set to produce a continuous 1000-cycle signal of predetermined amplitude, and may also be set to produce a signal of the same amplitude which automatically varies between 600 cycles and 3300 cycles during a period on the order of one second. A control 11a is provided for selecting the type of signal to be produced. The oscillator 11, like the other individual circuit elements of FIG. 2, is of conventional, commercially available design. The oscillator 11 may be of the motor driven variable condenser heterodyne type having a sweep rate of 1 cps. and a sweep range of 600–3300 cps.

The output of the oscillator 11 is fed to successive ones of a plurality of receivers 12 undergoing test. A microphone 13 responds to the output of successive receivers 12 and produces a signal in response thereto which is fed to a logarithmic amplifier 14 and a rectifier 15 to produce a voltage E–1 at the output of the rectifier. Because of the logarithmic characteristic of the amplifier 14 the voltage E–1 varies directly with the receiver output in db.

The microphone 13 should, of course, have excellent frequency response, and is preferably a combined condenser microphone and amplifier, capable of being calibrated and adjusted. The logarithmic amplifier may be a logarithmic attenuator such as made by Custom Electronic Products, San Diego, California, together with suitable amplification, and the rectifier 15 may be of a conventional type employing diodes and suitable filtering.

A reference voltage source 16 is preferably provided having an output voltage which is equivalent to the output of the microphone 13 when actuated by a 72 db output receiver 12. Through operation of a switch 16a the voltage source 16 may be made to feed the logarithmic amplifier 14, in place of the microphone 13, in order to test the test circuitry. Since the voltage source 16 does not constitute an operating part of the testing apparatus it is not described in further detail herein.

With the oscillator 11 producing a 1000-cycle signal, the voltage E–1 represents the output of the receiver 12 which happens to be under test. The voltage E–1 is fed to a differential amplifier 17 which is biased by a reference voltage source 18. If the voltage E–1 falls below a value corresponding to a 72 db output of the receiver 12, the differential amplifier 17 is caused to operate a relay 19 which actuates a suitable alarm, not shown. The differential amplifier 17, the voltage source 18 and the relay 19 may be of conventional design.

The voltage E–1 is applied also to one end of a potentiometer 20, while the other side of this potentiometer has a bias voltage E–B applied thereto. The voltage E–B is derived from a potentiometer 21 which is connected to a suitable D.C. voltage source as shown. The bias voltage E–B is preferably of polarity opposite to that of E–1, and equal to the magnitude of E–1 when the output of the receiver 12 is 72 db. The resulting voltage E–2 on the adjustable tap of the potentiometer 20 is thus proportional to the excess in actual db output of the receiver 12 over the reference output of 72 db. The voltage E–2 is taken from the adjustable tap of the potentiometer 20 in order that E–2 may be adjusted to zero value when test voltage is applied to the system by the reference voltage source 16.

The voltage E–2 is fed to a differential amplifier 22 whose other input is maintained at ground level as shown. The output voltage E–3 of the amplifier 22 is, therefore, merely an amplification of the input voltage E–2. The amplifier 22 may be of conventional design and, more particularly, may be a differential operational amplifier such as a George A. Philbrick Researches, Inc., Model P–2 using suitable feedback resistances, as illustrated, to provide the desired gain.

When the control 11a is in its number one position such that the oscillator 11 produces a 1000-cycle signal, a switch 11b associated therewith is closed such that a portion of the voltage E–3 is applied through feedback resistors 23 and 24, serving as a voltage divider, to a capacitor 25. Accordingly, the capacitor 25 is charged to a voltage whose magnitude corresponds to the output of the receiver 12 under test when subjected to the 1000-cycle output of the oscillator 11.

When the control 11a is moved to its number 2 position wherein the oscillator is caused to produce an output of varying frequency, it opens the switch 11b such that the capacitor 25 is isolated from the output of the differential amplifier 22. The voltage E–3 (which is now varying slightly in accordance with the frequency response of the receiver 12 under test) and the voltage of the capacitor 25 are fed to the two inputs of a differential amplifier 31 which may be a differential operational amplifier of the type referred to above.

The output E–5 of the differential amplifier 31 is an amplification of the difference between the voltage on the capacitor 25 and the voltage E–3. Referring again to FIG. 1, it may be seen that the voltage E–5 represents the deviation of the curve A from the reference value established by the response at 1000 cycles of the receiver under test.

It will be apparent to those skilled in the art that the voltage E–5 may be observed by an operator during the cycling of the oscillator 11 through the prescribed frequency range, and if the voltage E–5 swings above a prescribed plus value or below a prescribed negative value, the operator can reject the receiver. In the illustrated embodiment of the invention, the voltage E–5 is compared automatically to both positive and negative reference voltages such that a reject signal is obtained automatically in the event that the voltage E–5 varies beyond prescribed limits.

The voltage E–5 is applied to a differential amplifier 33 which is biased by a positive reference voltage derived from a voltage source 34. The voltage E–5 is also applied to a differential amplifier 35 which is biased by a negative reference voltage derived from a voltage source 36.

In the actual embodiment of the invention illustrated in the drawing, the voltage E–5 is equal to two volts for each decibel difference between the output of the receiver 12 under test at 1000 cycles and the output of the receiver at any given instant during the cycling of the oscillator through the prescribed frequency range. Also, the voltage E–5 is negative when the output of the receiver 12 under varying frequency exceeds the output of the receiver at 1000 cycles. Accordingly, the positive reference voltage derived from the source 34 is made to be 8 volts, and the negative reference voltage derived from the source 36 is made to be —6 volts.

If the output of the receiver under test at any instant exceeds the reference output by 3 db, the voltage E–5 attains a value greater than —6 volts with the result that the differential amplifier 35 fires and actuates a relay 38. If the output of the receiver under test at any instant falls below the reference output by 4 db, the voltage E–5 attains a value in excess of +8 volts and causes the differential amplifier 33 to fire and energize a relay 39. The relays 38 and 39 may in turn either indicate failure of the receiver under test or may cause physical rejection of the receiver under test in any well known manner.

While one embodiment of the invention has been disclosed, many modifications will be apparent, and it is intended that the invention be interpreted as including all modifications which fall within the true spirit and scope of the invention.

What is claimed is:

1. Test apparatus for determining whether the response of a device to a variable preselected characteristic of a signal applied thereto deviates by more than a prescribed amount from the response of the device to the preselected characteristic of the signal maintained constant as applied thereto comprising:

a first signal source for supplying a first signal exhibiting a first electrical characteristic controlled to be selectively constant and variable to a device under test, said signal source including switching means to control selectively which one of the two conditions of the first characteristic is associated with the first signal at any one period in time;

first circuit means electrically coupled to the device under test for producing a second signal having a measurable second characteristic which varies as a function of the responsiveness of the device to the first characteristic of said first signal applied thereto;

second circuit means connected to said first circuit means for storing a third signal having a characteristic corresponding in kind and magnitude to the measurable second characteristic of said second signal only during a period in which the device operatively receives the first signal with said first characteristic thereof maintained constant, and third circuit means connected to said first circuit means and to said second circuit means for comparing the magnitudes of said common characteristic of said second and third signals, respectively, only during a period in which said device operatively receives first signals with said first characteristic thereof controlled to be variable, and for producing a fourth signal having a characteristic common to and representative of the deviation, in magnitude, of said measurable characteristic of the second signal with respect to that of the third stored signal, the magnitude of said fourth signal thereby providing an indication of whether the deviation in response of said device to said first characteristic of said first signal when varied is within a prescribed amount of the response of the device to said first characteristic when maintained constant.

2. Test apparatus in accordance with claim 1, wherein said first signal comprises an A.C. signal and said first characteristic is the frequency thereof, and wherein said second, third and fourth signals comprise D.C. signals with said common measurable characteristic comprising the respective voltages thereof.

3. Apparatus in accordance with claim 2 further including a D.C. reference signal source producing a D.C. voltage, the magnitude of which corresponds to a prescribed maximum voltage of said fourth signal, and fourth circuit means for comparing the voltages of said fourth signal and said reference signal, and for producing a fifth D.C. signal corresponding in measurable units to the deviation of said fourth signal beyond the prescribed maximum value thereof.

4. Apparatus for testing the frequency response of a translating device comprising:
   an A.C. signal source for supplying signals of specified and variable frequencies selectively to a translating device under test;
   first circuit means electrically coupled to the translating device under test for producing a first D.C. signal, the voltage magnitude of which varies as a function of the frequency response of the device only during a period in which said device operatively receives an A.C. signal of specified frequency;
   a D.C. reference signal source producing a D.C. voltage, the magnitude of which corresponds to a prescribed minimum voltage of the first D.C. signal;
   second circuit means connected to said first circuit means and to said D.C. reference signal source for comparing the magnitudes of the voltages respectively produced thereby, and for producing a second D.C. signal, the voltage magnitude of which corresponds to the voltage difference between said first D.C. reference signal voltage and said first D.C. signal voltage only during a period in which said device operatively receives an A.C. signal of said specified frequency;
   third circuit means selectively connectible to said second circuit means for storing a voltage corresponding in magnitude to that of the second D.C. signal; and
   fourth circuit means connected to said second circuit means and selectively connectible to said third circuit means for comparing the magnitude of the stored voltage with the magnitude of the voltage of a third D.C. signal produced by said second circuit means only during a period in which said device operatively receives A.C. signals of varying frequencies, and for producing a fourth D.C. signal, the voltage magnitude of which is representative of the voltage difference between said third D.C. signal and said stored voltage.

5. Apparatus in accordance with claim 4, wherein said second circuit means further includes means for producing a warning signal in the event that the magnitude of the D.C. reference signal voltage exceeds that of the first D.C. signal.

6. Apparatus in accordance with claim 5 further comprising:
   a second D.C. reference signal source producing a D.C. voltage, the magnitude of which corresponds to a prescribed maximum voltage deviation limit for the fourth D.C. signal, and
   fifth circuit means connected to said fourth circuit means and to said second D.C. reference signal source for comparing the magnitudes of the voltages respectively produced thereby, and for producing a fifth D.C. signal representative of the deviation, in measurable units, of the fourth D.C. signal voltage beyond the prescribed maximum voltage deviation limit set therefor.

7. Apparatus for testing the frequency response of a translating device comprising:
   an A.C. signal source for supplying signals of specified and variable frequencies selectively to an input of a translating device under test;
   first circuit means electrically coupled to an output of the translating device under test for producing a first D.C. signal, the voltage magnitude of which varies as a function of the frequency response of the device only during a period in which said device operatively receives an A.C. signal of specified frequency;
   a first D.C. reference signal source producing a D.C. voltage, the magnitude of which corresponds to a prescribed minimum voltage of the first D.C. signal;
   second circuit means connected to said first circuit means and to said D.C. reference signal source for comparing the magnitudes of the voltages respectively produced thereby, and for producing a second D.C. signal, the voltage magnitude of which corresponds to the voltage difference between said first D.C. reference signal voltage and said first D.C. signal voltage only during a period in which said device operatively receives an A.C. signal of said specified frequency;
   third circuit means selectively connectible to said second circuit means for storing a voltage corresponding in magnitude to that of the second D.C. signal;
   fourth circuit means connected to said second circuit means and selectively connectible to said third circuit means for comparing the magnitude of the stored voltage with the magnitude of the voltage of a third D.C. signal produced by said second circuit means only during a period in which said device operatively receives A.C. signals of varying frequencies, and for producing a fourth D.C. signal, the voltage magnitude of which is representative of the voltage difference between said third D.C. signal and said stored voltage;
   a second D.C. reference signal source producing a D.C. voltage, the magnitude of which corresponds to a prescribed maximum voltage deviation limit for the fourth D.C. signal, and
   fifth circuit means connected to said fourth circuit means and to said second D.C. reference signal source for comparing the magnitudes of the voltages respectively produced thereby, and for producing a fifth D.C. signal voltage representative of the deviation, in measurable units, of the fourth D.C. signal voltage beyond the prescribed maximum voltage deviation limit set therefor.

References Cited by the Examiner
UNITED STATES PATENTS

| | | | |
|---|---|---|---|
| 2,745,015 | 5/1956 | Stillman. | |
| 2,870,430 | 1/1959 | Hancock | 324—57 X |
| 2,907,022 | 9/1959 | Kendall | 324—78 X |
| 3,158,759 | 11/1964 | Jasper | 324—146 X |

References Cited by the Applicant
UNITED STATES PATENTS

| | | |
|---|---|---|
| 2,682,638 | 6/1954 | Enabnit. |
| 2,801,333 | 7/1957 | Jordan. |

WALTER L. CARLSON, *Primary Examiner.*

P. F. WILLE, *Assistant Examiner.*